(12) United States Patent
Tsai et al.

(10) Patent No.: US 8,739,080 B1
(45) Date of Patent: May 27, 2014

(54) MASK ERROR ENHANCEMENT FACTOR (MEEF) AWARE MASK RULE CHECK (MRC)

(71) Applicant: Taiwan Semiconductor Manufacturing Company, Ltd., Hsin-Chu (TW)

(72) Inventors: Cheng-Lung Tsai, Hsin-Chu (TW); Jui-Hsuan Feng, Lotung (TW); Sheng-Wen Lin, Kaohsiung (TW); Wen-Chun Huang, Tainan (TW); Ru-Gun Liu, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/645,205

(22) Filed: Oct. 4, 2012

(51) Int. Cl.
*G06F 17/50* (2006.01)
(52) U.S. Cl.
USPC ............... 716/54; 716/50; 716/51; 716/52; 716/53; 716/55; 430/5; 430/30

(58) Field of Classification Search
USPC .................... 716/50–55; 430/5, 30
See application file for complete search history.

(56) References Cited

U.S. PATENT DOCUMENTS

| 7,632,610 | B2 * | 12/2009 | Wallace et al. | 430/5 |
| 7,648,803 | B2 * | 1/2010 | Sivakumar et al. | 430/5 |
| 8,381,153 | B2 * | 2/2013 | Chiang et al. | 716/110 |
| 2005/0081179 | A1 * | 4/2005 | Melvin, III | 716/20 |
| 2013/0205265 | A1 * | 8/2013 | Kuo et al. | 716/53 |

* cited by examiner

*Primary Examiner* — Nghia Doan
(74) *Attorney, Agent, or Firm* — Haynes and Boone, LLP

(57) ABSTRACT

The present disclosure describes methods of forming a mask. In an example, the method includes receiving an integrated circuit (IC) design layout, modifying the IC design layout data using an optical proximity correction (OPC) process, thereby providing an OPCed IC design layout, and modifying the OPCed IC design layout data using a mask rule check (MRC) process, wherein the MRC process corrects rule violations of the OPCed IC design layout data using a mask error enhancement factor (MEEF) index, thereby providing a MRC/OPCed IC design layout.

20 Claims, 7 Drawing Sheets

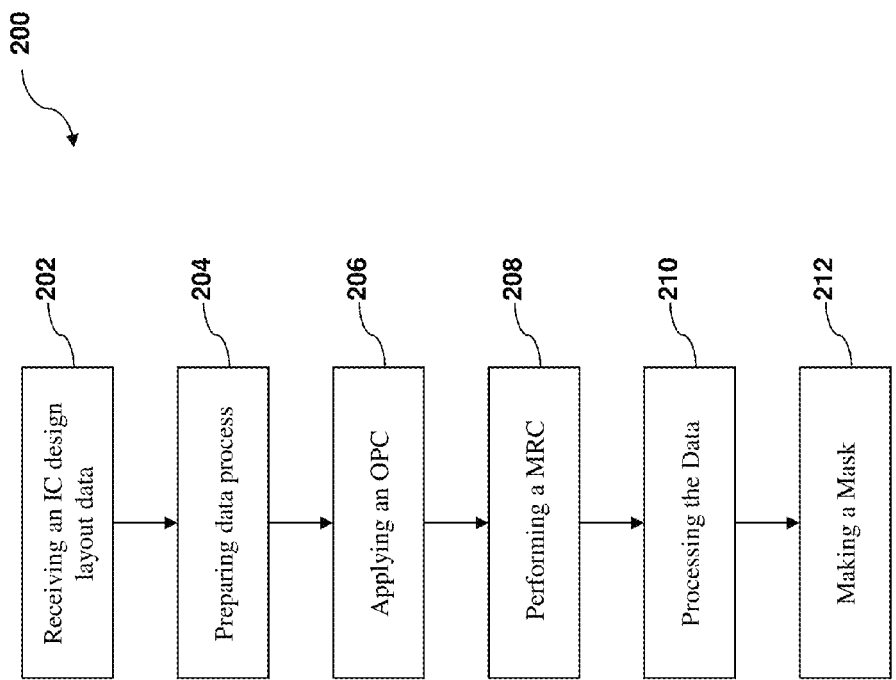

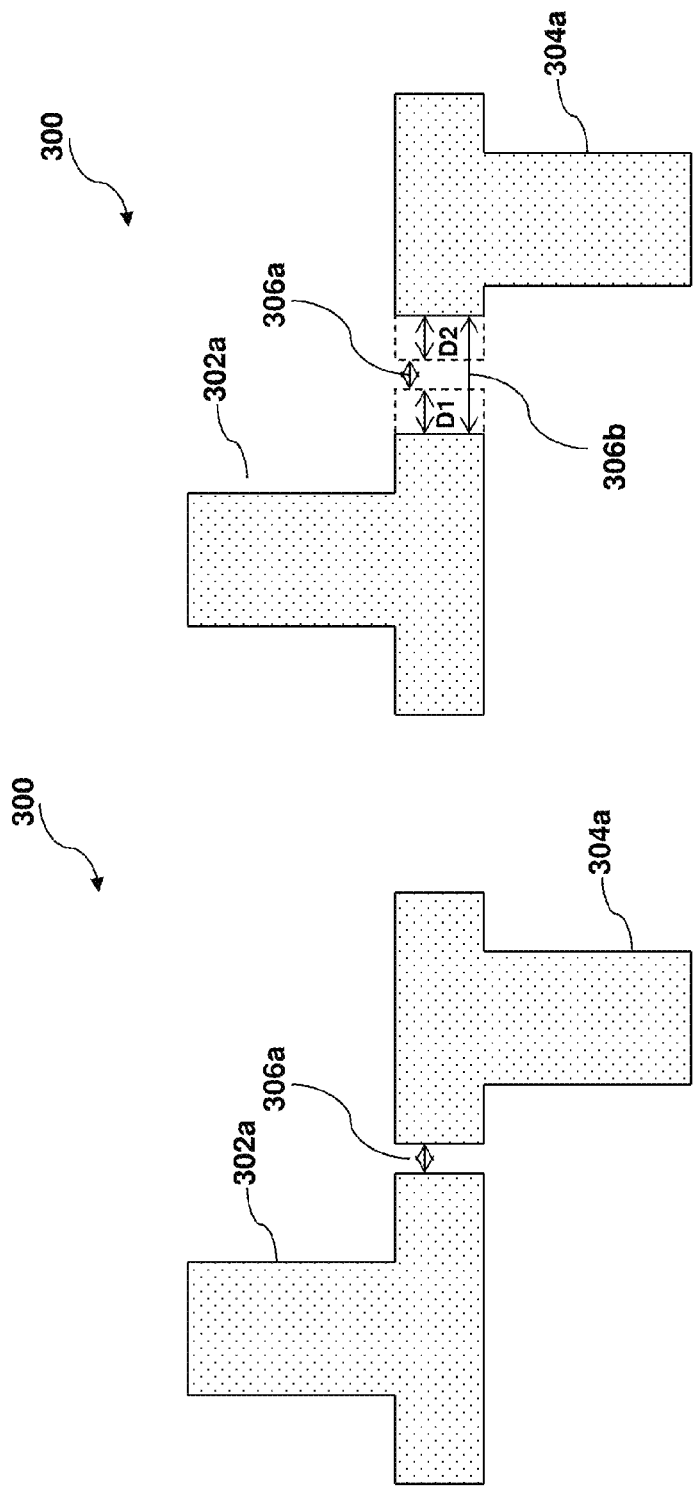

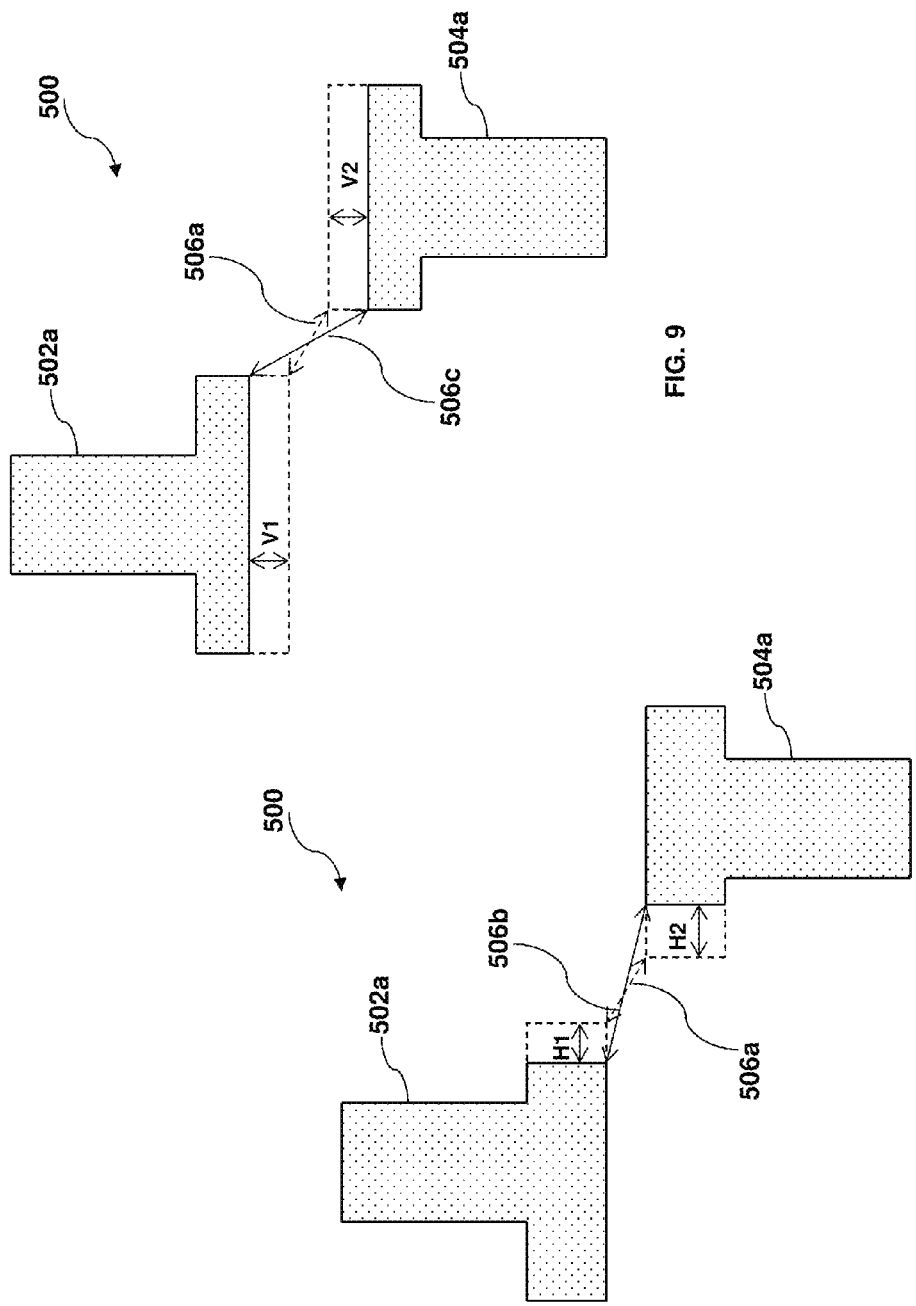

MASK ERROR ENHANCEMENT FACTOR (MEEF) AWARE MASK RULE CHECK (MRC)

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC processing and manufacturing are needed. For example, light diffraction in an optical lithography system becomes an obstacle for further scaling down the feature size. Common techniques used to decrease the light diffraction impact include optical proximity correction (OPC), phase shift mask (PSM), and immersion optical lithography systems. When using OPC, a mask rule check (MRC) is typically performed after the OPC, where any space violation detected by the MRC is corrected by pulling back the features of an IC design layout causing the space violation. Conventionally, the pullback is performed by pulling back each feature a same distance. Such correction may be not effective. Accordingly, what is needed is a method to improve the MRC.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

FIG. 2 is a flow chart of making a mask for implementing one or more embodiments of the present disclosure.

FIGS. 3-4 represent an example of correcting a mask rule check (MRC) violation according to one or more embodiments of the present disclosure.

FIGS. 7-9 represent an example of correcting a mask rule check (MRC) violation by a method for implementing one or more embodiments of the present disclosure.

DETAILED DESCRIPTION

Figure 1:
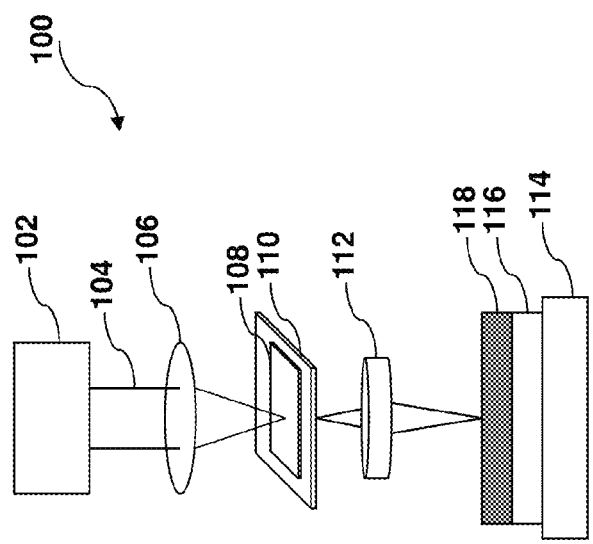
FIG. 1 represents a diagram of an optical lithography system for benefitting from one or more embodiments of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, an optical lithography system 100 is an example of a system that can benefit for one or more embodiments of the present disclosure. The optical lithography system 100 includes a light source 102, a light 104, a condense lens 106, a photomask 108, a mask stage 110, a projection lens 112, a substrate stage 114, a substrate 116 and a resist film 118. However, other configurations and inclusion or omission of the device may be possible. In the present disclosure, the system 100 is also referred as a stepper or a scanner, and the photo mask 108 is also referred to as a mask, a photo mask, or a reticle. In the present embodiment, the light source 102 includes a radiation source providing the light 104 having a wavelength range from UV to DUV. For example, a mercury lamp provides UV wavelength, such as G-line (436 nm) or I-line (365 nm), or an excimer laser provides DUV wavelength, such as 248 nm, 193 nm, or 157 nm. The condense lens 106 is configured to guide the light 104 to the photomask 108. The photomask 108 blocks a portion of the light 104 and provides an aerial image of the light 104 to form the patterned light 104. The photomask 108 may be a binary mask (BIM), a super binary mask (SBIM), or a phase shift mask (PSM), which includes an alternative phase shift mask (alt. PSM) or an attenuated phase shift mask (att. PSM). The photo mask 108 is positioned on the mask stage 110. The mask stage 110 includes a plurality of motors, roller guides, and tables; secures the photomask 108 on the mask stage 110 by vacuum; and provides accurate position and movement of the photomask 108 in X, Y, and Z directions during alignment, focus, leveling and exposure operation in the optical lithography system 100. The projection lens 112 includes a magnification lens for reducing the pattern image provided by the photomask 108 and guides the patterned light 104a to the resist film 118 deposited on the substrate 116 secured by the substrate stage 114. The substrate stage 114 includes motors, roller guides, and tables; secures the substrate 116 by vacuum; and provides accurate position and movement of the substrate 116 in X, Y, and Z directions during alignment, focus, leveling and exposure operations in the optical lithography system 100 so that the image of the photomask is transferred onto the substrate in a repetitive fashion (though other lithography methods are possible). The optical lithography system 100, or portions thereof, may include additional items, such as a vacuum system and/or a cooling system.

Continuing with the present embodiments, the substrate 116 deposited with the resist film 118 is loaded on the substrate stage 114 for exposing by the patterned light 104. The resist film 118 includes a positive tone resist or a negative tone resist. The substrate 116 includes a wafer substrate. The wafer substrate includes a silicon wafer. Alternatively or additionally, the wafer may includes another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP. In yet another alternative, the wafer is a semiconductor on insulator (SOI). A plurality of conductive and non-conductive thin films may be deposited on the wafer. For example, the conductive thin films may include a metal such as aluminum (Al), copper (Cu), tungsten (W), nickel (Ni), titanium (Ti), gold (Au), and platinum (Pt), or alloys thereof. The insulator film may include silicon oxide or silicon nitride. The substrate may be a blank mask substrate that includes a low thermal expansion material such as quartz, silicon, silicon carbide, or silicon oxide-titanium oxide compound.

Referring to FIG. 2, a flow chart of a method 200 illustrates one embodiment of a mask making process. In the present disclosure, the term mask, photomask and reticle are used to refer to the same item. The method 200 begins at step 202 by providing or receiving an IC design layout data (or IC design layout pattern) from a designer. The designer can be a separate design house or can be part of a semiconductor fabrication facility (fab) for making IC productions according to the IC design layout. In various embodiments, the semiconductor fab may be capable of making photomasks, semiconductor wafers, or both. The IC design layout includes various geometrical patterns designed for an IC product and based on a specification of the IC product.

The IC design layout is presented in one or more data files having the information of the geometrical patterns. The IC design layout is expressed as either "gds" or "oasis" format. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines and vias of an interlayer interconnection, and openings for bonding pads, to be formed in and on a semiconductor substrate (such as a silicon wafer) and various material layers disposed over the semiconductor substrate. The IC design layout may include certain assist features, such as for imaging effect, processing enhancement, and/or mask identification information. In the present disclosure, a feature is also referred to as a segment.

As shown in FIG. 2, the method 200 proceeds to step 204 for preparing data process. The step 204 includes running a design rule check (DRC) to verify the IC design layout satisfies a semiconductor manufacture process of the fab. The step 204 also includes performing a logic operation (LOP) with small bias corrections requested by the fab. Execution then proceeds to step 206 in which an optical proximity correction (OPC) modification to the LOP modified design layout data is performed. The OPC modified design layout data prepared at step 206 proceeds to step 208 for performing a mask rule check (MRC) to verify the OPC modified features satisfy the semiconductor manufacture process of the fab. In the present embodiments, the MRC verifies that a minimum line width of the OPC modified features, or a minimum space between two adjacent OPC modified features, is within capability of the semiconductor manufacture mask-shop of the fab. The MRC also includes a correction, such as a pullback, if a space/width rule is violated for bright-field/dark-field process. After step 208, the method 200 proceeds to step 210 for processing the OPC modified data for a mask writer. The step 210 includes fracturing the complicated OPC modified design layout into a plurality of simple shapes for the mask writer. For example, a complex polygon is fractured into rectangles, trapezoids, or combination thereof. The step 210 also includes converting the fractured OPC modified IC design layout data to an electron beam writer format for the mask writer. The converted IC design layout data proceeds to step 212 for making a mask (or fabricating a mask). Step 212 includes creating (or writing) a plurality of designed layout patterns on the mask by an electron beam writer, an ion beam writer, or a laser beam writer using the converted OPC modified IC design layout data in step 210. Additional steps can be provided before, during, and after the method 200, and some the steps described can be replaced, eliminated, or moved around for additional embodiments of the method 200.

In one embodiment of the present disclosure, the mask may be a binary mask (BIM), a super binary mask (SBIM), or a phase shift mask (PSM), which includes an alternative phase shift mask (alt. PSM) or an attenuated phase shift mask (att. PSM). In another embodiment, the mask may be a transmissive mask used under ultra-violet light (e.g. G-line, or Mine) or under deep ultra-violet light (DUV), or a reflective mask used under extreme ultra-violet light (EUV).

Referring now to FIG. 3, an example of a layout of a device 300 is illustrated according to one or more embodiments of the present disclosure. The device 300 includes two adjacent segments, a main segment 302a and a context segment 304a. A space 306a is located between the main segment 302a and the context segment 304a. However, other configurations and inclusion or omission of the device 300 may be possible. In the present disclosure, a segment is also referred to as a feature, a pattern, or a polygon. The main segment 302a and the context segment 304a are formed after OPC modification in step 206 of the method 200 as shown in FIG. 2. In an embodiment, a value of the space 306a is verified by performing the MRC at step 208 of the method 200. For example, the MRC may specify that a minimum space of the space 306a is 12 nm. If the space 306a is smaller than 12 nm, such as 6 nm, the MRC detects a space violation in the layout of the device 300. The space violation can be corrected by pulling back the main segment 302a and the context segment 304a.

FIG. 4 is an example of a pulling back process that can be implemented during the MRC at step 208 according to one or more embodiments of the present disclosure. In the present example, a space 306b is a corrected space between the main segment 302a and the context segment 304a after pulling back. The space 306b meets the minimum space requirement set by the MRC, for example, 12 nm. In the present embodiment, pulling back is performed by pulling back the main segment 302a and the context segment 304a an equal distance. For example, where the space 306a is 6 nm and the minimum space in the MRC is 12 nm, the pulling back process pulls back the main segment 302a a distance D1 and the context segment 304a a distance D2, where D1=D2 (for example, D1=D2=3 nm). After pulling the main segment 302a and the context segment 304a back, the space 306b is 12 nm and thus meets the minimum space requirement.

As shown in FIGS. 3-4, the space violation correction of the space 306a is performed by pulling back equal distances from the main segment 302a and the context segment 304a, respectively. By pulling back the two adjacent, related segments equal distances, a mask error enhancement factor (MEEF) is not considered in the method 200. For example, a mask image of a feature of an IC is magnified by 4 times. This magnification factor (4×) reduces feature sensitivity to a mask image error. However, with the feature size scaling down, a mask image error factor may exceed one. In other words, a dimension error of a feature of an IC may be more than ¼ the dimension error on the mask. The MEEF will be discussed in more detail below. In the present embodiments, with size scaling down of ICs, such as the segments in the IC layout of the device 300, equal pulling back from the main segment 302a and the context segment 304a may have different effects because the main segment 302a or the context segment 304a may have different MEEFs due to a different pitch for the main segment 302a and the context segment 302a. An OPC contour convergence for the main segment 302a or the context segment 304a may not be on design target by the equal pulling back.

Figure 5:
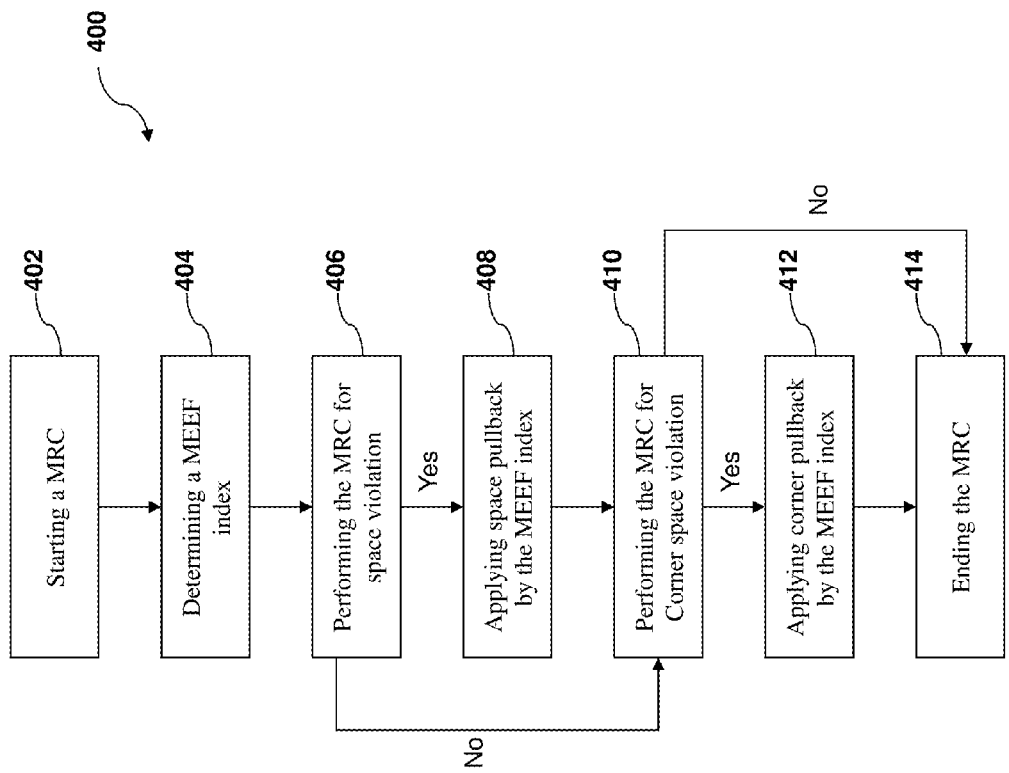
FIG. 5 is a flow chart of performing a mask rule check for implementing one or more embodiments of the present disclosure.

Referring now to FIG. 5, a flow chart of a method 400 of performing the MRC for making a mask is illustrated for benefitting one or more embodiments of the present disclosure. The method 400 may be included in the method 200 at step 208, where the MRC process is performed. The method 400 begins at step 402 by starting the MRC. The step 402 includes receiving the OPC modified IC design layout data from step 206 of the method 200. The step 402 also includes set up rules for the OPC modified IC design layout data. The method 400 proceeds to step 404 for determining a MEEF index by using the simulated contour with mask bias for each segment (feature). The step 404 includes determining the MEEF index for each segment. After the step 404, the method 400 proceeds to step 406 for a space violation check.

As shown in FIG. 5, the step 406 includes verifying if the space between two segments meets the minimum space requirement set by the MRC. After step 406, the method 400 may proceed to different steps depending on if the MRC space rule is violated. If the minimum space rule is violated, the method 400 proceeds to step 408 for applying pulling back from two segments involving the minimum space violation to meet the minimum space requirement. The method 400 proceeds to step 410 for a corner space violation check after step 408. If the minimum space rule is not violated at step 406, the method 400 skips the step 408 and proceeds to step 410 for performing the MRC for the corner space violation check. The step 410 includes verifying if the corner space between two segments meets the minimum corner space requirement set by the MRC.

As shown in FIG. 5, after step 410, the method 400 may proceed to different step depending on if the MRC corner space rule is violated. If the minimum corner space rule is violated, the method 400 proceeds to step 412 for applying pulling back from two segments involving the minimum corner space violation to meet the minimum corner space requirement. After step 412, the method 400 proceeds to step 414 for finishing the MRC. If the minimum corner rule is not violated at step 410, the method 400 skips the step 412 and proceeds to step 414 for finishing the MRC. Additional steps can be provided before, during, and after the method 400, and some the steps described can be replaced, eliminated, or moved around for additional embodiments of the method 400.

Figure 6:
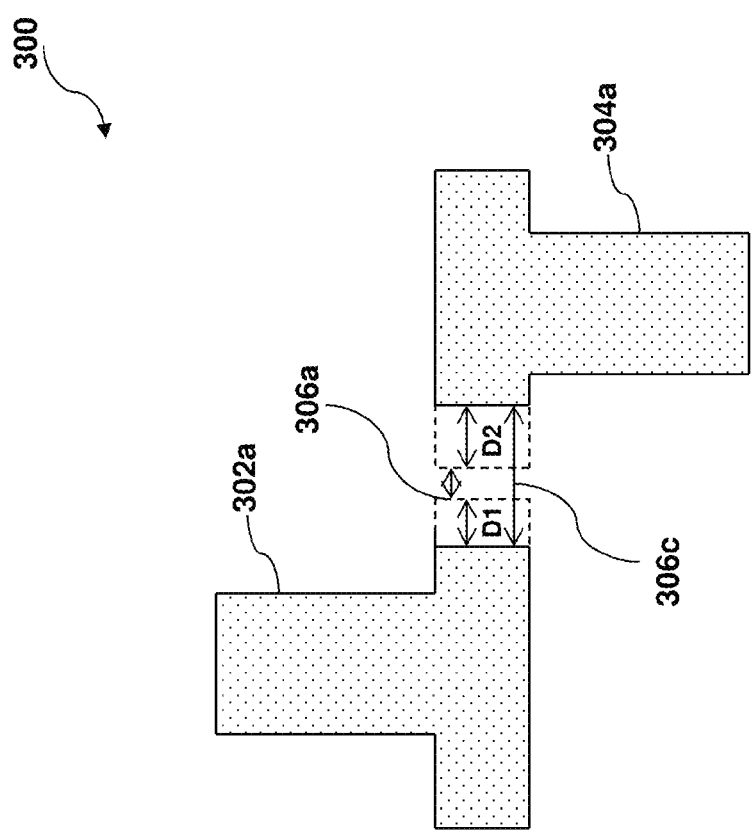
FIG. 6 is an example of correcting a mask rule check (MRC) violation by a method for implementing one or more embodiments of the present disclosure.

Referring now to FIG. 6, an example of correcting the space violation of the device 300 by the method 400 is illustrated for benefitting one or more embodiments of the present disclosure. The original layout of the device 300 is shown in FIG. 3. The space 306a is detected for the space violation by the MRC of the method 400. According to the method 400, the pulling back correction is determined by an effective MEEF index. The effective MEEF index is determined by a CD error of a segment on a wafer divided by a CD error of an image associated with the segment. However, it is difficult to evaluate a CD of a segment on a wafer during OPC correction process, thus an analogous term "effective MEEF index" is determined by a simulated contour CD error of a segment on a wafer divided by a CD bias of a segment on a wafer. Each segment has an associated effective MEEF index. The effective MEEF index for the main segment 302a is defined as mMEEF index, and the effective MEEF index for the context segment 304a is defined as cMEEF index. The pulling back on the main segment 302a, mPullback, and the pulling back on the context segment 304a, cPullback, is determined by a pullback ratio. The pullback ratio for the main segment 302a, mPullback ratio, is defined as:

$$\text{mPullback ratio} = \text{cMEEF}/(\text{mMEEF}+\text{cMEEF}) \quad \text{eq. (1)}$$

The pullback ratio for the context segment 304a, cPullback Ratio, is defined as:

$$\text{cPullback ratio} = \text{mMEEF}/(\text{mMEEF}+\text{cMEEF}) \quad \text{eq. (2)}$$

Therefore, the mPullback is defined as, $$\text{mPullback} = (\text{mPullback ratio}) \times \text{Violation} \quad \text{eq. (3)}$$

and the cPullback is defined as, $$\text{cPullback} = (\text{mPullback ratio}) \times \text{Violation} \quad \text{eq. (4)}$$

For example, for the IC layout of device 300 as shown in FIG. 6, mMEEF is 6, cMEEF is 3, the space 306a is 6 nm, and the minimum space set by the MRC for the device 300 is 12 nm. In the present example, the space 306a exhibits a space violation of 6 nm (12 nm−6 nm=6). The mPullback ratio is 1/3 (3/(6+3)=1/3) using eq. (1), and the cPullback ratio is 2/3 (6/(6+3)=2/3) using eq. (2). Therefore, the pull back distance (D1) for the main segment 302a, mPullback, is 2 nm (1/3×6 nm=2 nm) using eq. (3); and the pull back distance (D2) for the context segment 304a, cPullback, is 4 nm (2/3×6 nm=4 nm) using eq. (4). After pulling back D1 (D1=2 nm) from the main segment 302a and D2 (D2=4 nm) from the context segment 304a, the minimum space of 12 nm (6 nm+2 nm+4 nm=12 nm) is reached as shown in FIG. 6.

Figure 7:
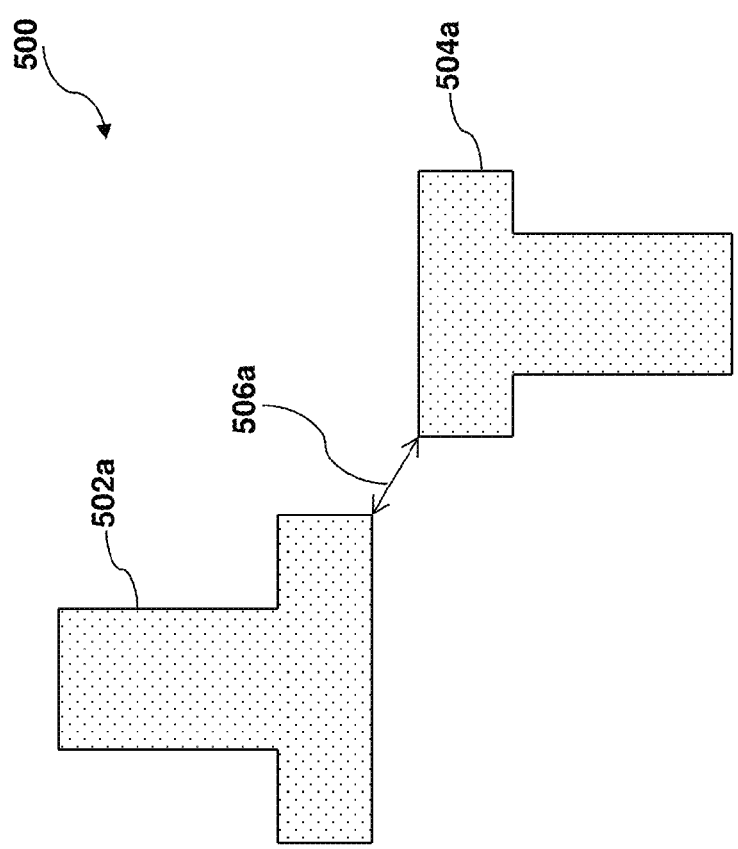

Referring now to FIGS. 7-9, an example of pulling back when an IC layout of a device 500 exhibits a corner space violation by the method 400 is illustrated for benefitting one or more embodiments of the present disclosure. The IC layout of the device 500 includes two segments, a main segment 502a and a context segment 504a. However, other configurations and inclusion or omission of the device 500 may be possible. As shown in FIG. 7, a corner space 506a is detected to determine whether it exhibits a corner space violation at the step 410 of the method 400 shown in FIG. 5. In the present example, the space 506a violates a minimum corner space specified by the MRC. As shown in FIGS. 8-9, a pullback correction can be performed in a horizontal correction, in a vertical direction, or in both directions. For example, where the corner space 506a is 6 nm and the minimum corner space of the MRC for the IC layout of the device 500 is 12 nm, the corner space violation is 6 nm. In an example, the mMEEF for vertical direction is 4, the mMEEF for horizontal direction is 6, the cMEEF for vertical direction is 4, and the cMEEF for horizontal direction is 3.

Referring to FIG. 8, in one embodiment, the corner space violation of the corner space 506a is corrected by pulling back in a horizontal direction. Here, the mPullback ratio is 1/3 (3/(6+3)=1/3) using eq. (1), and the cPullback ratio is 2/3 (6/(6+3)=2/3) using eq. (2). Therefore, a horizontal pull back distance (H1) from the main segment 502a, mPullback, is 2 nm (1/3×6 nm=2 nm) using eq. (3); and a horizontal pull back distance (H2) from the context segment 504a, cPullback, is 4 nm (2/3×6 nm=4 nm) using eq. (4). After pulling back H1 (H1=2 nm) from the main segment 502a and H2 (H2=4 nm) from the context segment 504a, a corner space 506b reaches the minimum space 12 nm (6 nm+2 nm+4 nm=12 nm) as shown in FIG. 8. Referring to FIG. 9, in another embodiment, the corner space violation of the corner space 506a is corrected by pulling back in a vertical direction. Here, the mPullback ratio is 1/2 (4/(4+4)=1/2) using eq. (1), and the cPullback ratio is 1/2 (4/(4+4)=1/2) using eq. (2). Therefore, a vertical pull back distance (V1) from the main segment 502a, mPullback, is 3 nm (1/2×6 nm=3 nm) using eq. (3); and a vertical pull back distance (V2) from the context segment 504a, cPullback, is 3 nm (1/2×6 nm=3 nm) using eq. (4). After pulling back V1 (V1=3 nm) from the main segment 502a and V2 (V2=3 nm) from the context segment 504a, a corner space 506c reaches the minimum space 12 nm (6 nm+3 nm+3 nm=12 nm) as shown in FIG. 9. Alternatively, in other embodiments, the main segment 502a and context segment 504a may be pulled back in both a horizontal and vertical direction to achieve the minimum space. Different embodiments may have different advantages, and no particular advantage is necessarily required of any embodiment.

Thus, the present disclosure describes a method of forming a mask. A method includes receiving an integrated circuit (IC) design layout comprising a main segment and a context segment, modifying the IC design layout data using an optical proximity correction (OPC) process, thereby providing an OPCed IC design layout, and modifying the OPCed IC design layout data using a mask rule check (MRC) process, wherein the MRC process corrects rule violations of the OPCed IC design layout data using a mask error enhancement factor (MEEF) index, thereby providing a MRC/OPCed IC design layout. The method further including fabricating a mask based on the MRC/OPCed IC design layout. The MEEF index includes a mMEEF index for the main segment and a cMEEF index for the context segment. Using the MRC includes locating a space violation between the main segment and the context segment. Using the MRC further includes correcting the space violation between the main segment and the context segment. Correcting the space violation includes correcting a corner space violation between the main segment and the context segment. Correcting a corner space violation including correcting in horizontal direction or in vertical direction. Correcting the space violation includes calculating a space pullback ratio by the mMEEF index and the cMEEF index. Correcting the space violation further includes pulling back the main segment by using the space pullback ratio and pulling back the context segment by using the space pullback ratio.

The present disclosure can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

The present disclosure also describes a method of preparing data for masking a mask. The method includes receiving an integrated circuit (IC) design layout data that includes a main segment and a context segment, modifying the IC design layout data by performing an optical proximity correction (OPC) technique, verifying a mask rule check (MRC) to the OPC modified IC design layout data, and performing a data process including fracturing the verified OPC modified IC design layout data and converting the fractured data into an electron beam writer format data. Verifying the MRC to the OPC modified IC design layout data includes determining a mask error enhancement factor (MEEF) index including a mMEEF for a main segment and a cMEEF for a context segment, calculating a space pullback ratio using the mMEEF and the cMEEF, and pulling back the main segment and the context segment using the space pullback ratio so that a minimum space requirement of the MRC is satisfied. The method further comprises fabricating the mask using an electron beam writer, an ion beam writer, or a laser beam writer. The method includes calculating a corner space pullback ratio using the mMEEF and the cMEEF, pulling back the main segment and the context segment using the corner space pullback ratio so that a minimum corner space requirement of the MRC is satisfied. Pulling back the main segment and the context segment for the corner space violation includes pulling back from a horizontal direction or from a vertical direction.

In another embodiment, a method of preparing data for making a mask is presented. The method includes receiving an integrated circuit (IC) design layout data that includes a main segment and a context segment, modifying the IC design layout data by performing an optical proximity correction (OPC) technique, applying a mask rule check (MRC) to the OPC modified IC design layout data, and performing a data process including fracturing the verified OPC modified IC design layout data and converting the fractured data into an electron beam writer format data. Applying the MRC to the OPC modified IC design layout data includes locating a space rule violation, and correcting the space rule violation by determining a mask error enhancement factor (MEEF) index including a mMEEF index for a main segment and a cMEEF index for a context segment, and calculating a space pullback ratio or a corner space pullback ratio using the mMEEF index and the cMEEF index. The method includes pulling back the main segment and the contest segment for the space violation using the space pullback ratio so that a minimum space requirement of the MRC is satisfied. The method includes pulling back the main segment and the context segment for a corner space violation using the corner space ratio so that a minimum corner space requirement of the MRC is satisfied.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method, comprising:
providing an integrated circuit (IC) layout, wherein the IC layout has a first feature and an adjacent second feature;
determining a first mask error enhancement factor (MEEF) index associated with the first feature using an electronic processor;
determining a second MEEF index associated with the second feature using an electronic processor;
determining a space violation of a distance between the first feature and the second feature using an electronic processor;
using the first MEEF index and the second MEEF index to remedy the space violation by modifying a location of at least an edge of the first feature, thereby increasing the distance between the first feature and the second feature; and fabricating a photomask, wherein the photomask has the modified location of the edge of the first feature.

2. The method of claim 1, wherein determining the first MEEF index includes using a simulated contour for the first feature.

3. The method of claim 2, wherein the first MEEF index is the simulated contour for the first feature divided by a critical dimension (CD) bias of the first feature.

4. The method of claim 1, wherein the using the first MEEF index and the second MEEF index includes:
using the first MEEF index and the second MEEF index to determine a pullback ratio for the first feature, and
multiplying the space violation by the pullback ratio to determine the modified location of the edge of the first feature.

5. The method of claim 1, wherein using the first MEEF index and the second MEEF index includes determining a ratio between the first MEEF index and the second MEEF index.

6. The method of claim 5, further comprising:
using the first MEEF index and the second MEEF index to determine a first pullback ratio for the first feature and a second pullback ratio for the second feature;
multiplying the space violation by the first pullback ratio to determine the modified location of the edge of the first feature; and
multiplying the space violation by the second pullback ratio to determine the modified location of an edge of the second feature.

7. The method of claim 6, wherein the modified location of the edge of the first feature and the modified location of the edge of the second feature provide a modified spacing between the first and second features that passes a mask rule check.

8. The method of claim 1, wherein the using the first MEEF index and the second MEEF index to remedy the space violation is performed during a mask rule check (MRC) process.

9. The method of claim 1, further comprising:
determining a corner space violation of a distance associated with the first feature;
using the first MEEF index to remedy the corner space violation by modifying a location of a corner of the first feature; and
wherein the fabricating the photomask includes fabricating the first feature with the modified location of the corner of the first feature.

10. A method of semiconductor device fabrication, comprising:
providing a layout of an integrated circuit (IC) device, wherein the layout has a first feature and an adjacent second feature;
using a data processor associated with a mask rule checking device to provide a modified layout, including to:
determine a first mask error enhancement factor (MEEF) index associated with the first feature and a second MEEF index associated with the second feature;
use the first MEEF index and the second MEEF index to determine a first pullback ratio associated with the first feature and a second pullback ratio associated with the second feature;
determine a space violation between the first feature and the second feature, wherein the space violation is a length greater than a design rule of minimum spacing between the first and second features;
multiply the length by the first pullback ratio to determine a pullback for an edge of the first feature;
multiply the length by the second pullback ratio to determine a pullback for an edge of the second feature; and
fabricating the IC device having the modified layout including the edge of the first feature defined by the pullback for the first feature and the edge of the second feature defined by the pullback for the second feature.

11. The method of claim 10, wherein the data processor is further used to:
determine a violation in a location of a corner of the first feature;
determine a third MEEF index associated with a horizontal direction of the corner of the first feature;
determine a fourth MEEF index associated with a horizontal direction of an adjacent corner of the second feature;
modify the location of the corner of the first feature and the location of the corner of the second feature, wherein the location is determined using the third MEEF index and the fourth MEEF index; and
wherein the fabricated IC device has the first feature and second feature having the modified location of the corners.

12. The method of claim 10, wherein the data processor is further used to:
determine a violation in a spacing between corners of the first and second features;
determine a third MEEF index associated with a vertical direction of the corner of the first feature;
determine a fourth MEEF index associated with a vertical direction of an adjacent corner of the second feature;
modify the location of the corner of the first feature, wherein the location is determined using the third MEEF index;
modify the location of the corner of the second feature, wherein the location is determined using the fourth MEEF index; and
wherein the fabricated IC device has the first feature and second feature having the modified location of the corners.

13. The method of claim 10, wherein the determining the first mask error enhancement factor (MEEF) index includes:
determining a simulated contour critical dimension (CD) error of the first feature;
determining a CD bias of an image of the first feature; and
dividing the simulated contour CD error by the CD bias to provide the first MEEF index.

14. The method of claim 10, wherein the fabricating the IC device includes:
fabricating a phase shift mask having the edge of the first feature defined by the pullback for the first feature and the edge of the second feature defined by the pullback for the second feature.

15. The method of claim 10, wherein the fabricating the IC device includes:
converting the layout into fractured data suitable for reading by an electron beam writer tool, wherein the fractured data defines a phase the edge of the first feature defined by the pullback for the first feature and the edge of the second feature defined by the pullback for the second feature.

16. A non-transitory medium storing instructions for a mask rule check (MRC), wherein the MRC includes:

instructions for computing a first mask error enhancement factor (MEEF) index associated with a first feature of a layout of a semiconductor device instructions for computing a second mask error enhancement factor (MEEF) index associated with a second feature of the layout of the semiconductor device, the second feature adjacent the first feature in the layout;

instructions for computing a pullback ratio associated with the first feature of the layout using the MEEF index of the feature;

receiving a design rule directed to a spacing between the first feature and the second feature;

instructions for determining a violation of a disposition of the first feature in the layout with respect to the design rule; and instructions for modifying a placement of at least one edge of the first feature feature, wherein the modifying the placement is determined using the pullback ratio of the first feature and the determined violation.

17. The non-transitory medium of claim 16, wherein the instructions for modifying the placement includes:

determining a distance between the first feature and the second feature, wherein the distance is a length greater than the design rule spacing; and multiplying the pullback ratio by the length greater than the design rule spacing.

18. The non-transitory medium of claim 16, wherein the instructions for computing the MEEF index includes:

receiving a simulated contour critical dimension (CD) error for the first feature;

receiving a CD bias of the first feature; and dividing the simulated contour CD error by the CD bias to determine the first MEEF index.

19. The non-transitory medium of claim 16, wherein the instructions further includes checking a minimum line width of the first feature.

20. The non-transitory medium of claim 16, wherein the instructions for determining the violation include verifying a spacing between the first feature and the second feature, wherein the spacing is associated with one of an edge and a corner.

\* \* \* \* \*